UNITED STATES PATENT OFFICE 1,988,766

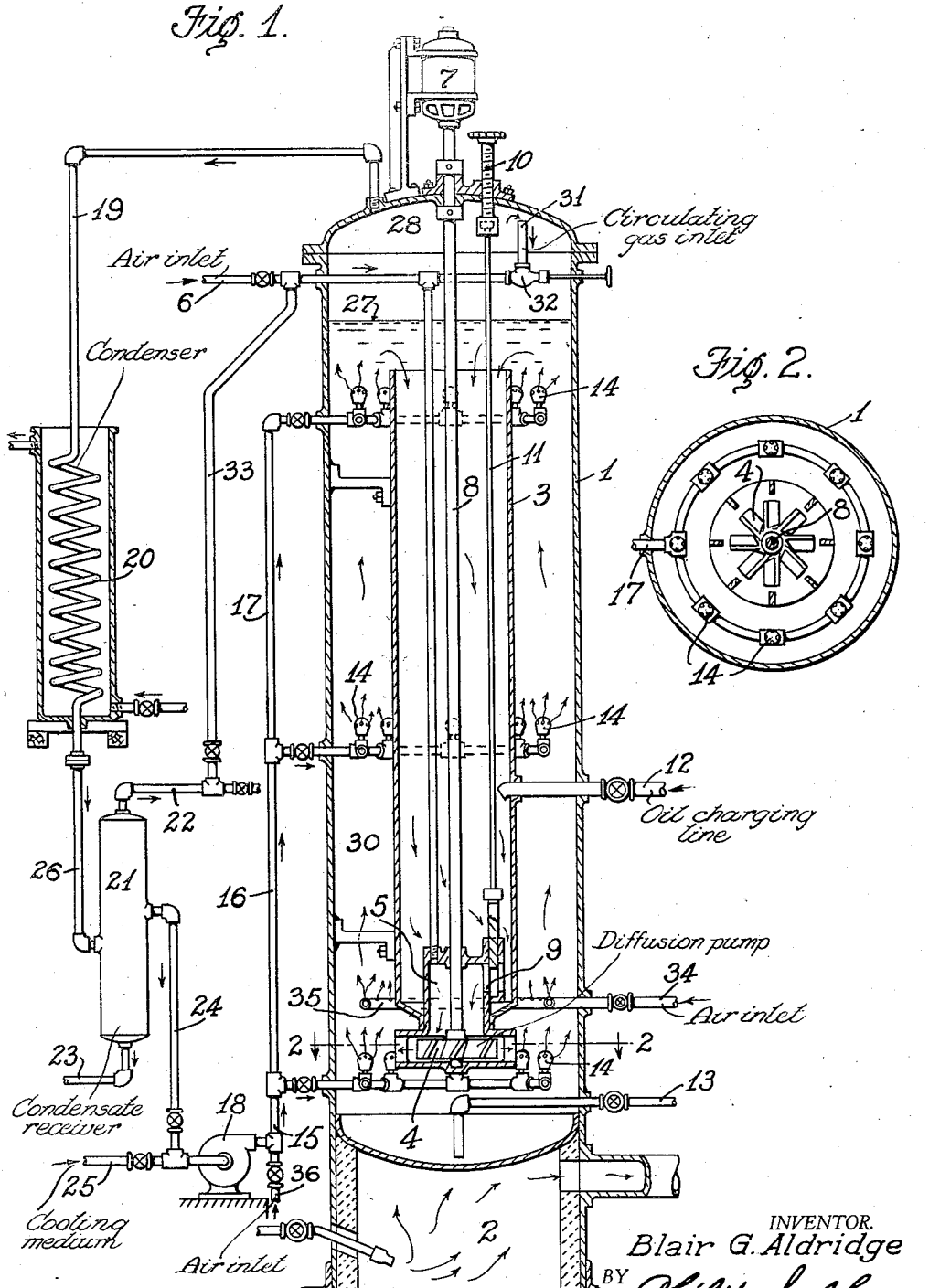

PROCESS AND APPARATUS FOR PRODUCING ASPHALT

Blair G. Aldridge, Los Angeles, Calif., assignor to Union Oil Company of California, Los Angeles, Calif., a corporation of California Application January 9, 1933, Serial No. 650,765

10 Claims. (Cl. 196—74)

This invention relates to a process and apparatus for treating petroleum oils and in particular to the production of oxidized or air blown asphalt.

It is an object of my invention to provide a simple, efficient and economical process and apparatus by which petroleum oils may be converted into asphaltic products of desired penetration, melting point, ductility and solubility.

Another object is to control the various characteristics of penetration, melting point, ductility and solubility of asphalt and to vary them independently and at will.

A further object is to control oxidation of oil to produce asphalt so as to obtain a uniformly oxidized asphalt.

It is also an object to provide a process and apparatus for controlling the intermingling of the oil and oxygen containing gas, to regulate the rate of reaction, to control the character of the oxidation and to control the temperature of oxidation.

The invention proposes to control the oxidation of the oil so as to partially oxidize the oil by contacting it with oxygen containing gas, to produce substantially complete use of the oxygen under controlled conditions, to remove the gaseous and vaporous reaction products and to repeat this partial oxidation in a recurring cycle of operation until products of desired characteristics are obtained.

In the conventional method of producing oxidized asphalt, air and steam in varying proportions are introduced into the bottom of a cylindrical still containing asphaltic oil and at the same time the asphaltic oil is heated to a temperature sufficient to obtain the necessary oxidizing reaction, i. e. about 450 to 550° F. The oxidation is usually continued from 18 to 36 hours, depending upon the character of the original stock and the characteristics desired in the final product. By such method, it is impossible to obtain the highest grade of asphalt. This is partly due to the fact that the air, in passing through the oil in large globules, is not likely to mix intimately with the oil, thereby resulting in the production of an asphalt which is partly over-oxidized and partly under-oxidized. Also a uniform temperature is difficult to maintain since the oxidizing reaction is exothermic and the added heat may result in overheating the asphaltic oil to a point of cracking and formation of carbonaceous matter thereby rendering the product more brittle and less ductile and less soluble than if uniform oxidation could have been effected.

I have discovered that in order to produce asphalts of high melting point which will have high ductility and solubility and low penetration characteristics, it is necessary to produce an intimate mixture of the oil to be oxidized and the oxygen-containing gas, so that all parts of the oil are uniformly exposed to the action of the oxygen. It is also desirable to maintain the air in intimate contact with the oil for sufficient time so that the oxygen of the air is consumed as much as possible. This promotes efficiency in the use of air and also permits the more refractory components of the oil to be oxidized. These components need more time since they oxidize much more slowly.

This oxidation evolves large quantities of heat, and I have discovered also that in making satisfactory products it is necessary to prevent over-oxidation if excessively hard asphalts are to be avoided, and to prevent over-heating because excessive rises in temperature are detrimental to the finished product. I have likewise discovered that it is necessary to effect uniform oxidation and to maintain a uniform temperature throughout the oxidation zone in order that uniformity of product may be obtained. I have also discovered that by maintaining a uniform temperature throughout the oxidation zone, it is possible to carry on the oxidation process much more rapidly without localized over-heating and/or under-heating of the products, than would otherwise be possible. Thus, by maintaining uniformity of temperature in the reaction zone I am able to produce a finished product of good quality at a maximum rate.

I have found that over-oxidation, over-heating and non-uniformity may be overcome by proper and adequate cooling. It is apparent that the rate at which the air or oxidizing agent may be mixed into the oil undergoing treatment is limited by the capacity of the apparatus to efficiently and uniformly remove the heat generated. Means employed to remove the heat of reaction, such as exchangers, result in non-uniformity of cooling, excessive cooling being brought about at one point in the reacting body while excessive heating is allowed at another point.

I have observed that in the usual method of injecting the oxidizing agent into the oil to be oxidized, an insufficiently intimate mixture is obtained, resulting in non-uniformity of distribution of said oxidizing agent and non-uniformity of oxidation of products. Thus a portion of the oil may be in contact with an excess of oxidizing agent while another portion may be insufficiently contacted.

According to the present invention, the amount of air used is relatively small and the cooling of the reacting material is controlled by heat exchange or absorption in direct contact with heat absorbing mediums. I have found that by injecting into the oil undergoing oxidation, a volatile liquid such as water or oil or other liquids having boiling points lower than the maximum temperature at which it is desired to allow the oxidation reaction to be carried on, the heat of reaction can be efficiently and uniformly removed, and a uniform and accurately limited temperature may be maintained throughout the reaction zone.

I have also found that in the case of using a cooling liquid having a relatively high boiling point, I can inject into the reacting constituents sufficient of the said cooling liquid for at least a portion of it to remain throughout the reaction zone in the liquid phase. Thus with a suitable cooling medium present throughout the reaction zone in the liquid phase, the temperature is uniformly regulated and limited, by evaporation, to the boiling temperature of said medium, and by utilizing such a cooling medium having a boiling temperature at or near the desired reaction temperature, the said reaction temperature can be accurately regulated and uniformly maintained throughout the reaction zone.

I have also found that by thoroughly diffusing the oxidizing agent throughout the oil by means of a diffuser, or the like, together with rapid circulation and the attendant turbulence of the oil, the requisite intimacy of mixture can be attained resulting in uniformity of reaction and heating throughout the reaction zone and production of a uniform and higher quality product.

From the foregoing it may be observed that the present invention comprises, in its broadest phases, a process for producing asphalt which comprises intimately commingling an oxygen containing gas with oil at a temperature sufficiently elevated to oxidize said oil into asphalt, and controlling said oxidation temperature by introducing into said oil, measured quantities of a heat absorbing medium having a boiling point lower than the temperature at which it is desired to carry on the oxidation.

In a more narrow phase, the invention comprises a process and apparatus for producing asphalt by commingling an oxygen containing gas with oil at a temperature sufficiently elevated to oxidize said oil to asphalt, controlling the oxidation temperature by directly mixing into the oil undergoing oxidation, a heat absorbing medium, said medium having a boiling point equal to or lower than the temperature at which it is desired to limit the reaction, the heat absorbed by the medium being its latent heat of vaporization, and injecting the said absorbing medium at a plurality of points throughout the reaction zone so that the absorption of heat may be uniformly effected.

The invention also includes the use of a heat absorbing medium, such as oil, which when mixed with the oil undergoing oxidation will lower the boiling point of the mixture to a temperature at which it is desired to limit the reaction. An immiscible liquid, such as water, may be injected into the reaction zone at a plurality of points, and, by reason of its latent heat of evaporation and frequency of injection, maintain the reacting constituents at substantially a uniform temperature.

The invention also includes the withdrawal and condensation of vapors from the asphalt conversion still, with the return of a portion of the condensate to the reaction zone to serve as a cooling medium as mentioned above.

The invention also includes the re-circulation of partially expended and/or inert gases through the oil, together with measured quantities of oxygen containing gas, to control temperature and reaction.

It is to be understood that the invention also includes the treatment of various oils by the present process and apparatus for the production of various other products than asphalt. For example, animal, vegetable and fish oils may be oxidized, or otherwise treated with gases by the same procedure and apparatus, and mineral oils may be likewise treated to obtain other products where gas contact is required under conditions similar to those herein described.

The accompanying drawing illustrates one embodiment of apparatus adapted for carrying out the process described.

In the drawing, Fig. 1 is a diagrammatic sectional elevation of an apparatus suitable for producing oxidized asphalt.

Fig. 2 is a cross section through the apparatus taken on line 2—2 of Fig. 1.

A vertical cylindrical drum 1 is provided for containing a quantity of oil undergoing treatment. Under the drum a furnace 2 is shown through which the drum contents may be initially heated to operating temperature. Inside the drum 1 is a cylinder 3 coaxial with said drum 1, said cylinder being open at its upper end and having a diffusing and circulating pump or impeller 4, at its lower end. This pump serves to circulate the oil and to intimately mix therewith the oxidizing gas which is supplied to the upstream side of said pump through chamber 5 and pipe 6. Oxidizing gas may also be supplied at the discharge side of pump 4 through a similar connection 34 and diffusion ring 35, or it may be introduced through a connection 36 on the discharge side of pump 18 and injected through the jets 14 either alone or mixed with the cooling medium. Connection 31 through valve 32 to pipe 6 in the gas space 28 provides a means for withdrawal of separated vapors and partially expended gases therefrom for re-injection and re-circulation through the oil. Pipe 33 also provides for reintroduction of separated gases from the condensate receiver 21. The pump 4 is rotated at high speed by motor 7 through connecting shaft 8. Gate valve 9 between cylinder 3 and chamber 5 serves to regulate the rate of circulation of oil and is operated from the outside of the drum through valve stem 10 and shaft 11. 12 is a charging line through which oil may be supplied continuously or intermittently through cylinder 3 into the system. The oxidized liquid products may be withdrawn from the bottom of the drum through draw-off line 13 either continuously or intermittently. Jets 14 positioned in the annular space between cylinder 3 and the tank wall are for the purpose of uniformly distributing and mixing a cooling medium into the circulating oil undergoing oxidation. The jets are supplied with a cooling medium through connecting tubes 15, 16 and 17 at a suitable pressure by pump 18.

Residual vapors from the heating and oxidized process within the drum 1, are withdrawn through a line 19 to condenser 20. Condensate flows from condenser 20 through line 26 to receiver and separator 21 from which uncondensed gases are withdrawn through line 22, and the condensate withdrawn through line 23 and/or 24. That portion of the said condensate withdrawn through line 24 is led to the suction of pump 18. A line 25 serves as an extraneous supply line to pump 18.

In operation, an oil, such as residuum, heavy oil such as lubricating oil distillate or gas oil, from crude oil is introduced into the drum 1 through supply line 12 filling the space inside of the cylinder 3 and the annular space between the said cylinder and the tank walls up to the approximate liquid level shown at 27, leaving a disengaging gas space 28 at the top. When the required charge is in the still, pump 4 is set into operation by motor 7 through drive shaft 8. Pump 4 takes suction from the lower end of the cylinder 3, the oil flowing into the pump through gate valve 9 and chamber 5 and being discharged radially outward from the diffusing impeller 4 into the annular space 30 in the tank surrounding the central cylinder 3. In this manner rapid circulation of the oil upward in the annular space 30 and downward through the central cylinder 3 in a continuous circuit, is established and maintained throughout the treatment of the oil. The rate of circulation may be regulated by varying the speed of the motor 7 or by regulating the opening of the gate valve 9 by means of stem 10 and shaft 11. After circulation has been established, furnace 2 is fired to heat the circulating oil to an initial temperature of about 300° F. When this temperature has been attained, the furnace heating is discontinued and the oxygen containing gas, such as air, is admitted to the oil through line 6, chamber 5 and diffusion pump 4, where it is intimately mixed with the circulating oil. By manipulation of valves 32 and 9, vapors and partly expanded gases from vapor space 28 can be withdrawn to the diffusion pump and re-injected into the oil either alone or mixed with fresh gas from line 6. Also, gases from the condensate receiver 21 can be withdrawn through pipe 33 and recirculated either with or without mixture with fresh air, through pipe 6. Oxidation of the oil then takes place and the temperature of the oil continues to rise without application of external heat until a temperature of about 500° F. is reached.

At this point in the operation, introduction of a heat absorbing medium is initiated through jets 14 in regulated quantity such that the oxidation temperature is limited to approximately 500° F. and is maintained uniformly thereat through out the oxidizing oil body. The heat absorbing medium may be supplied from the condensate out of receiver 21 or it may be extraneous material, such as water or a volatile oil or gas introduced through line 25 into pump 18 and thence forced through manifolding feed lines 15, 16, 17 to the jets 14. This material may be ejected at high velocity from jets 14 under high pressure from pump 18 to insure thorough and uniform distribution throughout the hot oil in the reaction zone. As many nozzles 14 may be employed as needed to supply a uniformly distributed cooling medium to the reaction zone.

As the volume of air supplied to the oil is increased, the quantity of cooling medium may be increased to maintain the proper temperature, thus allowing a more rapid treatment of the oil than would be possible without this means of heat dissipation. By regulation of the proportion of recirculated gas, from either receiver 21 or space 28, and fresh gas introduced through pipe 6, the rate of oxidation can be controlled and the dissipation of heat aided. Also, where injection of small quantities of oxygen containing gas is desirable, the mixture therewith of a larger volume of recirculated gases aids in its uniform distribution throughout the oil undergoing oxidation.

The vapors from the heated oil and the residual gases from the oxidation process within the drum 1, are removed from the vapor space 28 at the top thereof through vapor line 19 and cooled in condenser 20 where partial condensation takes place. The cooled products from condenser 20 run down through line 26 to the receiver 21 where separation of the gases and condensed liquid take place. Gases are removed from the receiver 21 through line 22. The condensates are removed through lines 23 and/or 24, that portion removed through 24 being returned to the tank by way of pump 18, lines 15, 16, 17 and nozzles 14, either alone or mixed with extraneous mediums introduced through line 25.

These mediums injected through jets 14 for the purpose of absorbing the heat of reaction from the oil are those fractions of oils or other liquids having boiling points equal to or lower than the temperature at which the reaction is being maintained. An immiscible liquid, such as water may be similarly introduced. Other liquids having boiling points not greater than that at which it is desired to maintain the reaction may be used, such as: liquid propane, gasoline, naphtha, kerosene, distillate, carbontetrachloride, and alcohol.

Where the cooling liquid is miscible and goes into solution with the reacting constituents before its evaporation takes place, the said cooling liquid must have characteristics such that the boiling point of the resulting mixture or solution is not greater than the temperature being maintained. The cooling in every case is accomplished by the absorption of heat by the latent heat of vaporization of the cooling mediums, mixtures or solution. It will be observed that the condensate formed in the process operating at the temperature at which it is desired to maintain said process will obviously be volatile at that same temperature and this condensate therefore is a suitable cooling medium and may be returned to the reaction zone for cooling and regulating the reaction temperature as described above.

The gas, air, oil, condensate and/or water, either supplied fresh to the treater or recirculated, may be precooled for the purpose of aiding in the regulation of the reaction temperature.

The operation of the process may be either batch or continuous. In operating continuously, after the initial charge has been brought up to the final operating temperature, charging stock is gradually and uniformly introduced through line 12 while an equal quantity of asphalt is withdrawn through draw-off line 13 to storage.

In certain cases it is desirable to use steam in the process to control the rate of oxidation and also to control ductility and flash point, and when this is the case, it may be introduced either through the line 6 with the air, through the extraneous oil line 25 to nozzles 14, or through line 34 and diffusion ring 35.

The melting point, penetration and ductility of asphalt may be effectively and independently controlled by the addition of certain materials or oils to the circulating asphaltic oil undergoing treatment. Thus, such oil fractions as steam blown asphalt, lubricating oil fractions, gas oil, sulphurized oil, vegetable oil and animal oil, may be introduced via line 25 or 12 and intimately mixed with the circulating oil. The character of the oil introduced is dependent upon the particular characteristics desired to be varied as will be understood by those skilled in the art. The character of the oil introduced may be similar to that of those constituents already in the asphaltic oil and which constituents are desirable in oxidized asphalt. Thus, these constituents may be increased in proportion, or may be added in sufficient quantities in order to replace some of the constituents removed by distillation or decomposed by cracking during oxidation. The oil may be added prior to the oxidation reaction, and be also oxidized, or it may be added after substantially complete oxidation of the asphaltic oil has been effected. The addition is generally determined by the character of the added oil and by the characteristics desired to be varied.

I have found that I can produce a new asphalt that is evenly oxidized and does not contain large proportions of over-oxidized and/or under-oxidized material. The process is more economical to operate than others.

It is to be understood that the process and apparatus are by no means limited to the preparation of asphalts, but may be used also for the blowing, oxidizing or other gas treatment of other oils including, fish oils, vegetable oils, and animal oils, wherever such apparatus and/or process would be in any way appropriate. The process is especially applicable where the reactions are exothermic, such as the oxidation of drying oils, of which the preparation of linseed oil may be given as an example.

It will be observed that many variations of the above procedure can be made without departing from the spirit of the invention. Thus, the agitation and circulation of the oil in the drum may be accomplished by other mechanical means. Circulation may be induced by the injected air, steam or cooling medium. Many other equivalent designs of drums may be used, but it is believed that a tall vertical one accomplishes a more efficient contact of oils and oxidizing agents and cooling mediums and is, therefore, the preferred structure.

The above description is not to be taken as limiting but merely as illustrative of the invention and as one mode of carrying it out. Many changes can be made within the scope of this invention which is set forth in the following claims.

I claim:

1. A process for producing asphalt which comprises commingling oil with an oxidizing gas at a sufficiently elevated temperature to oxidize said oil to asphalt, introducing into the oil undergoing oxidation regulated quantities of a liquid heat absorbing medium having an average boiling point temperature lower than the temperature at which it is desired to carry on the said oxidation and vaporizing the greater portion of said liquid heat absorbing medium to control the temperature of oxidation.

2. A process as in claim 1 in which the liquid heat absorbing medium comprises a liquid which is miscible with said oil undergoing oxidation.

3. A process for producing asphalt which comprises commingling oil with oxidizing gas at a sufficiently elevated temperature to oxidize said oil to asphalt, and controlling said oxidation reaction temperature by introducing an immiscible inert liquid heat absorbing medium into the oil undergoing oxidation.

4. A process for producing asphalt which comprises commingling oil with oxidizing gas at a sufficiently elevated temperature to oxidize said oil to asphalt, and controlling said oxidation reaction temperature by introducing an immiscible liquid heat absorbing medium into the oil undergoing oxidation at a plurality of points throughout the reaction zone.

5. A process as in claim 4 where the immiscible heat absorbing medium is water.

6. A process as in claim 1 in which the liquid heat absorbing medium is liquid propane.

7. A process as in claim 1 in which the heat absorbing medium is introduced at a plurality of points throughout the oxidation zone.

8. A process for producing asphalt which comprises commingling oil with an oxidizing gas at a sufficiently elevated temperature to oxidize said oil to asphalt, separating vapors and gases from said oil, condensing a portion of said vapors to form an oil fraction having an average boiling point temperature lower than the temperature at which it is desired to carry on the said oxidation, introducing said condensate into the oil stream undergoing oxidation and vaporizing the greater portion of said condensate to control the temperature of oxidation.

9. An apparatus for oxidizing oils to asphalt comprising a cylindrical tank, a coaxial cylinder inside said tank, means to circulate oil down through said cylinder and up through the annular passage between said cylinder and the wall of said tank in a continuous circuit, means to diffuse oxygen containing gas throughout the upward flowing portion of the circulating oil and nozzle means to intimately mix a heat absorbing medium throughout the oil in the said upward flowing portion of the oil.

10. An apparatus for oxidizing oils to asphalt comprising a tank to contain oil to be oxidized, means to heat said oil, a pump to circulate oil within said tank, a valve on the oil suction connection of said pump to maintain a partial vacuum therein, an air inlet connection from the atmosphere to the region of vacuum of the said suction connection of said pump, means to inject a stream of oxygen containing gas into said oil, and nozzle means to commingle a heat absorbing medium with the oil undergoing oxidation.

BLAIR G. ALDRIDGE.